(12) United States Patent
Husain

(10) Patent No.: US 6,644,691 B2
(45) Date of Patent: Nov. 11, 2003

(54) IMPACT-ABSORBING APPARATUS FOR FRONT ENDS OF VEHICLES

(76) Inventor: Mohamed T. Husain, 2940 Gulf Streem Way, Mississauga, Ontario (CA), L5N-6T9

( * ) Notice: Subject to any disclaimer, the term of this patent is extended or adjusted under 35 U.S.C. 154(b) by 0 days.

(21) Appl. No.: 10/076,242

(22) Filed: Feb. 15, 2002

(65) Prior Publication Data

US 2003/0155168 A1 Aug. 21, 2003

(51) Int. Cl.$^7$ .......................... B60R 19/00; B62D 21/15
(52) U.S. Cl. ..................... 280/784; 180/274; 296/189
(58) Field of Search .................. 280/784; 180/232, 180/274; 296/189, 188

(56) References Cited

U.S. PATENT DOCUMENTS

| | | | | |
|---|---|---|---|---|
| 3,899,047 A | * | 8/1975 | Maeda et al. | 188/374 |
| 3,904,237 A | * | 9/1975 | Barenyi et al. | 280/784 |
| 4,411,462 A | * | 10/1983 | Buehrig et al. | 296/189 |
| 5,178,230 A | * | 1/1993 | Goor | 180/232 |

FOREIGN PATENT DOCUMENTS

EP      0 598 685 A1 * 5/1994 ........... B60R/19/00

* cited by examiner

*Primary Examiner*—Peter C. English

(57) ABSTRACT

An impact-absorbing apparatus for front ends of vehicles for reducing the shock and injuries to passengers in a vehicle when involved in a front end collision. The impact-absorbing apparatus for front ends of vehicles includes a support assembly including elongate support members being adapted to be mounted in an engine compartment, and also includes elongate cross members interconnecting the elongate support members; and further includes an impact absorbing assembly being mounted upon the support assembly; and also includes an impact-receiving assembly being mounted to the impact-absorbing assembly.

7 Claims, 3 Drawing Sheets

IMPACT-ABSORBING APPARATUS FOR FRONT ENDS OF VEHICLES

BACKGROUND OF THE INVENTION

1. Field of the Invention

The present invention relates to vehicle front end impact absorbing apparatuses and more particularly pertains to a new impact-absorbing apparatus for front ends of vehicles for reducing the shock and injuries to passengers in a vehicle when involved in a front end collision.

1. Description of the Prior Art

The use of vehicle front end. impact absorbing apparatuses is known in the prior art. More specifically, vehicle front end impact absorbing apparatuses heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 2,094,739; U.S. Pat. No. 5,967,573; U.S. Pat. No. 4,474,257; U.S. Pat. No. Des. 410,879; U.S. Pat. No. 5,199,755; and U.S. Pat. No. 5,096,242.

While these devices fulfill their respective, particular objectives and requirements, the aforementioned patents do not disclose a new impact-absorbing apparatus for front ends of vehicles. The present invention includes a support assembly including elongate support members being adapted to be mounted in an engine compartment, and also includes elongate cross members interconnecting the elongate support members; and further includes an impact absorbing assembly being mounted upon the support assembly; and also includes an impact-receiving assembly being mounted to the impact-absorbing assembly.

In these respects, the impact-absorbing apparatus for front ends of vehicles according to the present invention substantially departs from the conventional concepts and designs of the prior art, and in so doing provides an apparatus primarily developed for the purpose of reducing the shock and injuries to passengers in a vehicle when involved in a front end collision.

SUMMARY OF THE INVENTION

The general purpose of the present invention, which will be described subsequently in greater detail, is to provide a new impact-absorbing apparatus for front ends of vehicles which has many of the advantages of the vehicle front end impact absorbing apparatuses mentioned heretofore and many novel features that result in a new impact-absorbing apparatus for front ends of vehicles which is not anticipated, rendered obvious, suggested, or even implied by any of the prior art vehicle front end impact absorbing apparatuses, either alone or in any combination thereof.

There has thus been outlined, rather broadly, the more important features of the impact-absorbing apparatus for front ends of vehicles in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

It is an object of the present invention to provide a new impact-absorbing apparatus for front ends of vehicles which has many of the advantages of the vehicle front end impact absorbing apparatuses mentioned heretofore and many novel features that result in a new impact-absorbing apparatus for front ends of vehicles which is not anticipated, rendered obvious, suggested, or even implied by any of the prior art vehicle front end impact absorbing apparatuses, either alone or in any combination thereof.

Still another object of the present invention is to provide a new impact-absorbing apparatus for front ends of vehicles for reducing the shock and injuries to passengers in a vehicle when involved in a front end collision.

Still yet another object of the present invention is to provide a new impact-absorbing apparatus for front ends of vehicles that can be easily installed in a vehicle.

Even still another object of the present invention is to provide a new impact-absorbing apparatus for front ends of vehicles that greatly prevents crumpling of the front end of a vehicle and redirects the force received in a collision.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
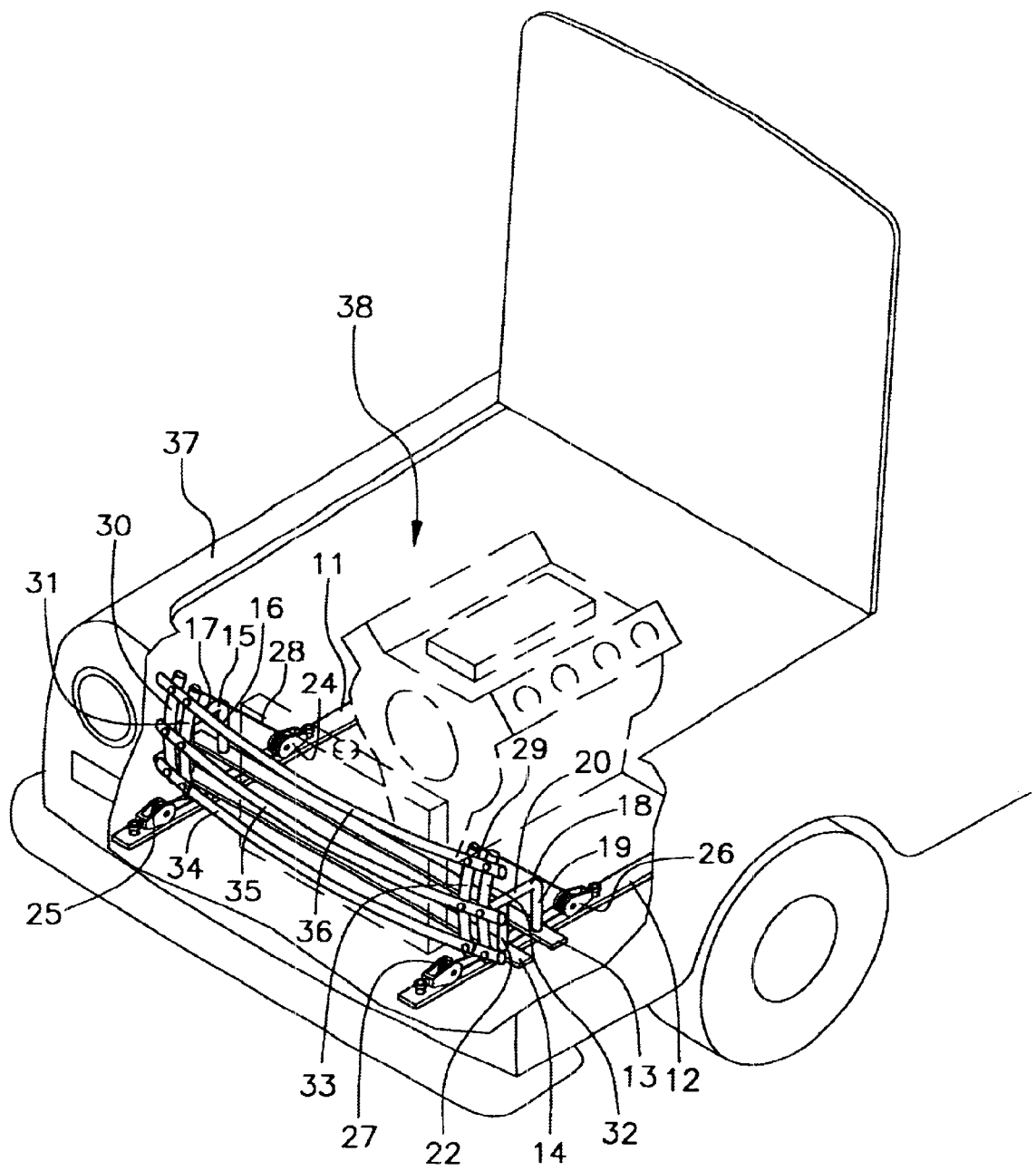
FIG. 1 is a perspective view of a new impact-absorbing apparatus for front ends of vehicles according to the present invention and shown in use.

With reference now to the drawings, and in particular to FIGS. 1 through 4 thereof, a new impact-absorbing apparatus for front ends of vehicles embodying the principles and concepts of the present invention and generally designated by the reference numeral 10 will be described.

As best illustrated in FIGS. 1 through 4, the impact-absorbing apparatus for front ends of vehicles 10 generally comprises a support assembly including a pair of elongate support members 11,12 being adapted to be mounted in an engine compartment 38 of a vehicle 37, and also including a pair of elongate cross members 13,14 conventionally interconnecting the elongate support members 11,12 with fasteners.

Figure 2:
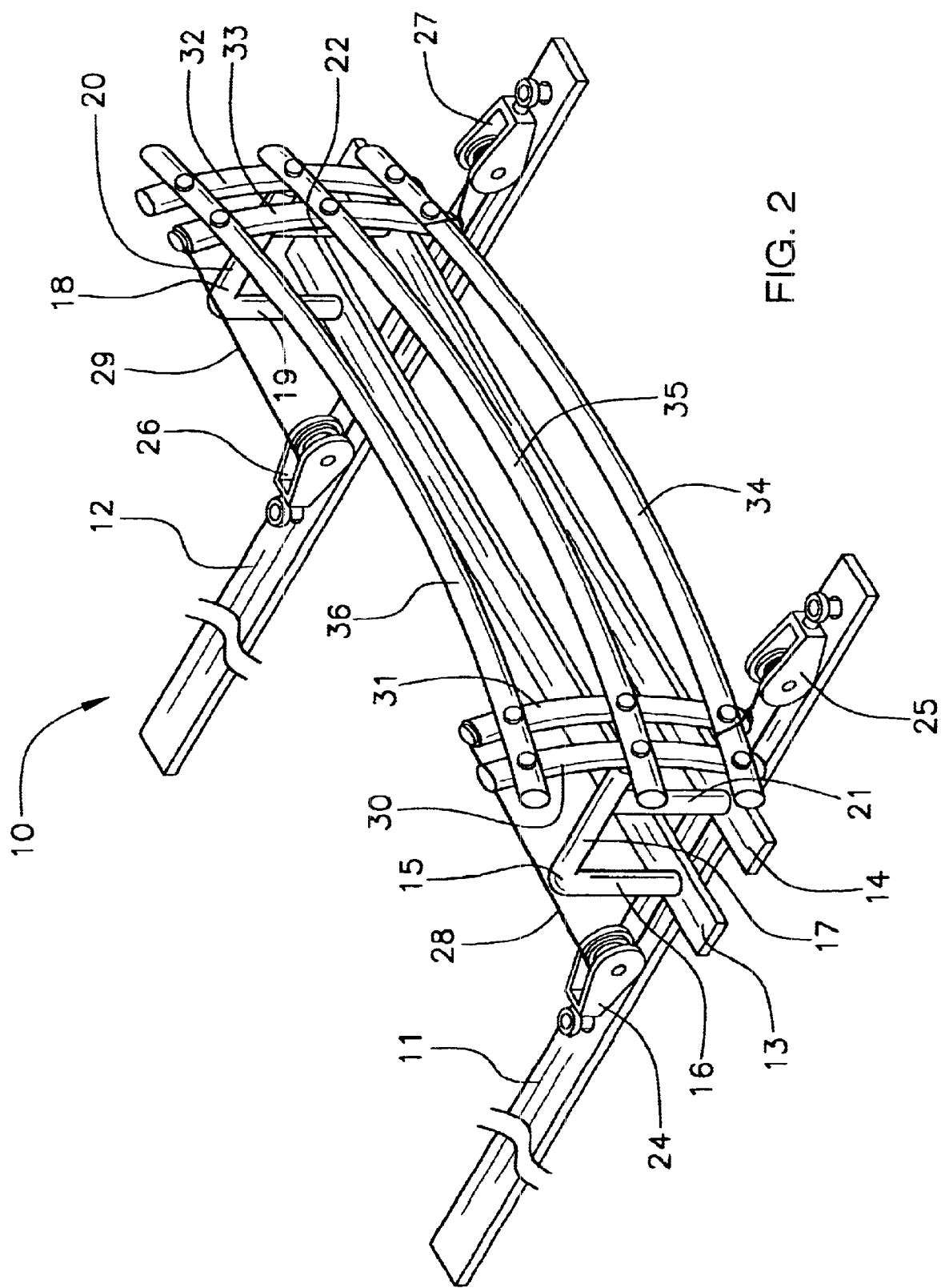
FIG. 2 is another perspective view of the present invention.
Figure 3:
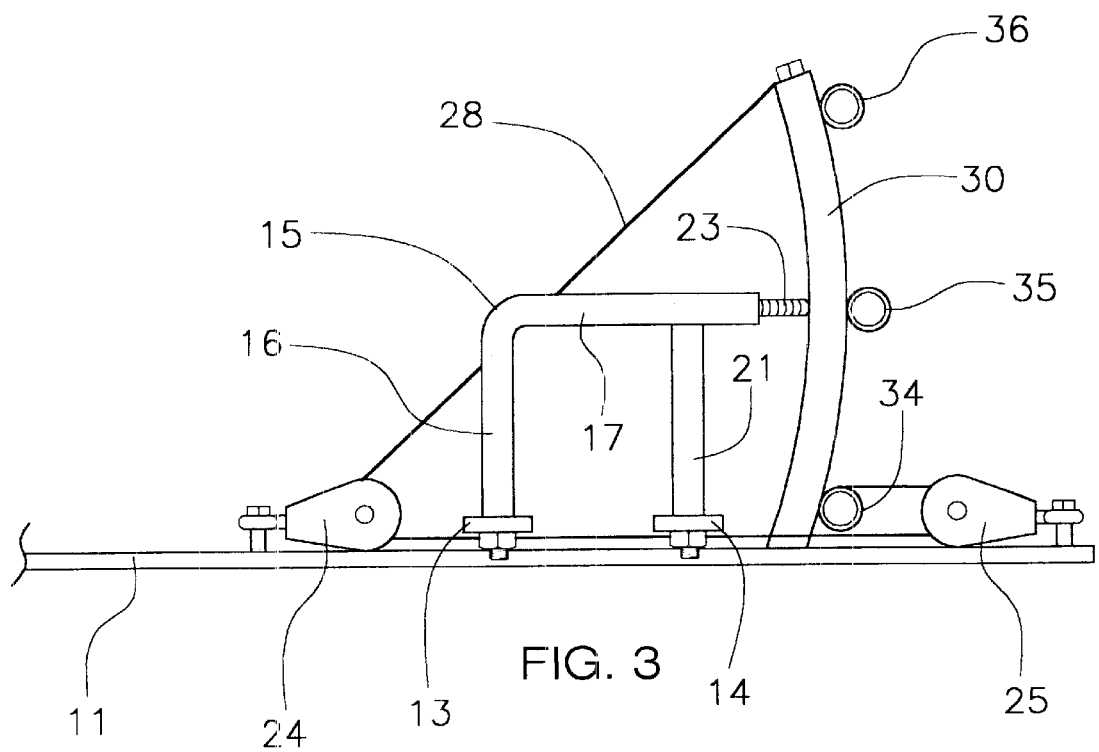
FIG. 3 is a side elevational view of a first embodiment of the present invention.
Figure 4:
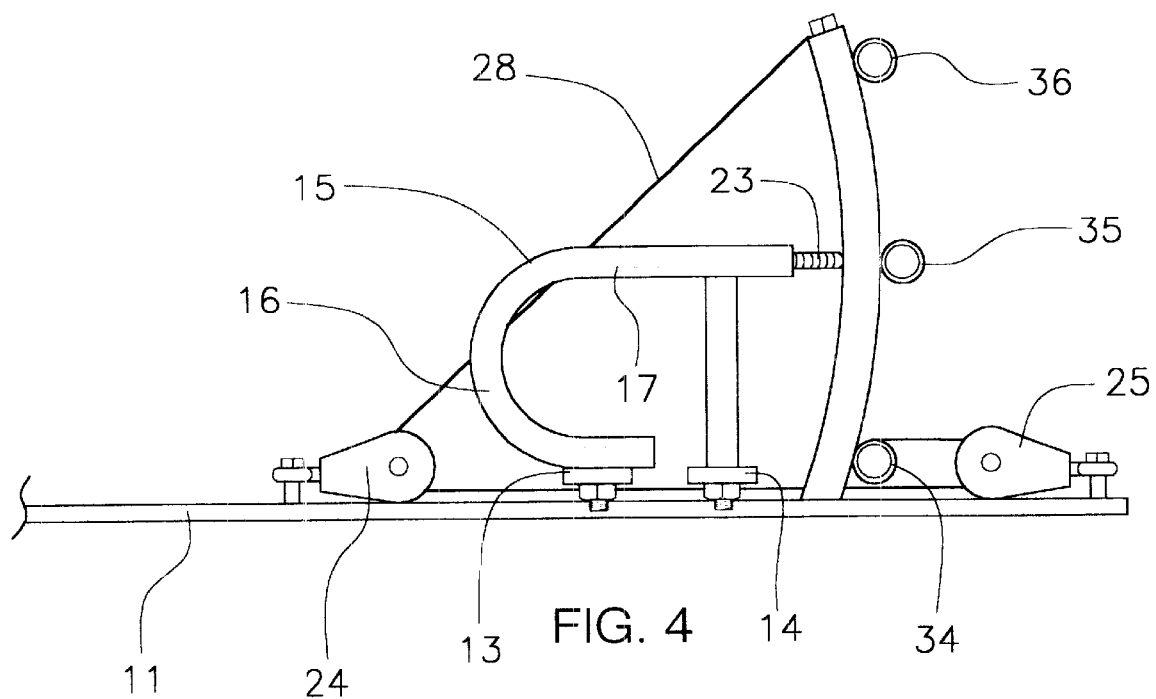
FIG. 4 is a side elevational view of a second embodiment of the present inventions

An impact absorbing assembly is conventionally mounted upon the support assembly. The impact-absorbing assembly includes tubular members 15,18 being removably mounted with fastening members to one of the elongate cross members 13,14 for absorbing shock due to an impact, and also includes tubular member supports 21,22 being removably and conventionally mounted with fastening members to the other one of the elongate cross members 13,14 and being conventionally connected to the tubular members 15,18, and further includes piston members 23 being movable in and extended from the tubular members 15,18; and also includes four pulley members 24–27 being conventionally mounted with bolts upon the support assembly, and further includes a pair of flexible line members 28,29 being carried by the pulley members 24–27 for stabilizing the impact-receiving assembly. In the embodiment of FIGS. 1–3, each of the tubular members 15,18 is angled and has a first portion 16,19 which is conventionally fastened to the support assembly, and also has a second portion 17,20 which is angled approximately 90 degrees to the first portion 16,19 and which has an open end. In the embodiment of FIG. 4, the tubular member 15 is curved. Each of the tubular member supports 21,22 is conventionally attached to the second portion 17,20 of a respective tubular member 15,18. Each of the piston members 23 is movably extended through the open end of the second portion 17,20 of a respective tubular member 15,18. Each of the pulley members 24–27 has an eyelet which is conventionally fastened to the support assembly. The tubular members 15,18 and the tubular member supports 21,22 are disposed between pairs of the pulley members 24–27.

An impact-receiving assembly is conventionally mounted to the impact-absorbing assembly. The impact-receiving assembly is attached to the piston members 23 and includes four arcuate post members 30–33 being securely and conventionally mounted upon the support assembly, and also includes three arcuate rail members 34–36 being conventionally mounted to and intersecting the arcuate post members 30–33. Each of the flexible line members 28,29 is carried by a respective pair of pulley members 24–27 and has ends one of which is conventionally attached to a top end of a respective arcuate post member 30–33 and another of which is attached to a bottom-most arcuate rail member 34.

In use, a front end collision will impact the arcuate rail members 34–36 resulting in the shock and impact being absorbed by the piston members 23 and the flexible line members 28,29 which will essentially prevent the arcuate rail members 34–36 from crumpling into the engine compartment 38 of the vehicle 37.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the impact-absorbing apparatus for front ends of vehicles. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. An impact-absorbing apparatus for front ends of vehicles comprising:

a support assembly including elongate support members being adapted to be mounted in an engine compartment, and also including elongate cross members interconnecting said elongate support members, an impact-absorbing assembly being mounted upon said support assembly, said impact-absorbing-assembly including tubular members being removably mounted to at least one of said elongate cross members for absorbing shock due to an impact, and also including tubular member supports being removably mounted to at least one of said elongate cross members and being connected to said tubular members, and further including piston members being movable in and extended from said tubular members;

an impact-receiving assembly being mounted to said impact-absorbing assembly;

pulley members being mounted upon said support assembly; and flexible line members being carried by said pulley members for stabilizing said impact-receiving assembly.

2. An impact-absorbing apparatus for front ends of vehicles as described in claim 1, wherein each of said tubular members is angled and has a first portion which is fastened to said support assembly, and also has a second portion which is angled approximately 90 degrees to said first portion and which has an open end.

3. An impact-absorbing apparatus for front ends of vehicles as described in claim 2, wherein each of said tubular member supports is attached to said second portion of a respective said tubular member.

4. An impact-absorbing apparatus for front ends of vehicles as described in claim 2, wherein each of said piston members is movably extended through said open end of said second portion of a respective said tubular member.

5. An impact-absorbing apparatus for front ends of vehicles as described in claim 1, wherein each of said pulley members has an eyelet which is fastened to said support assembly, said tubular members and said tubular member supports being disposed between pairs of said pulley members.

6. An impact-absorbing apparatus for fronts end of vehicles as described in claim 1, wherein said impact-receiving assembly is attached to said piston members and includes a plurality of arcuate post members being securely mounted upon said support assembly, and also includes a plurality of arcuate rail members being mounted to and intersecting said arcuate post members.

7. An impact-absorbing apparatus for as described in claim 6, wherein each of said flexible line members is carried by a respective pair of said pulley members and has ends one of which is attached to a top end of a respective said arcuate post member and another of which is attached to a bottom-most said arcuate rail member.

* * * * *